(No Model.)
W. H. FITZ GERALD.
DIE FOR WATCH CASES.
No. 416,835. Patented Dec. 10, 1889.
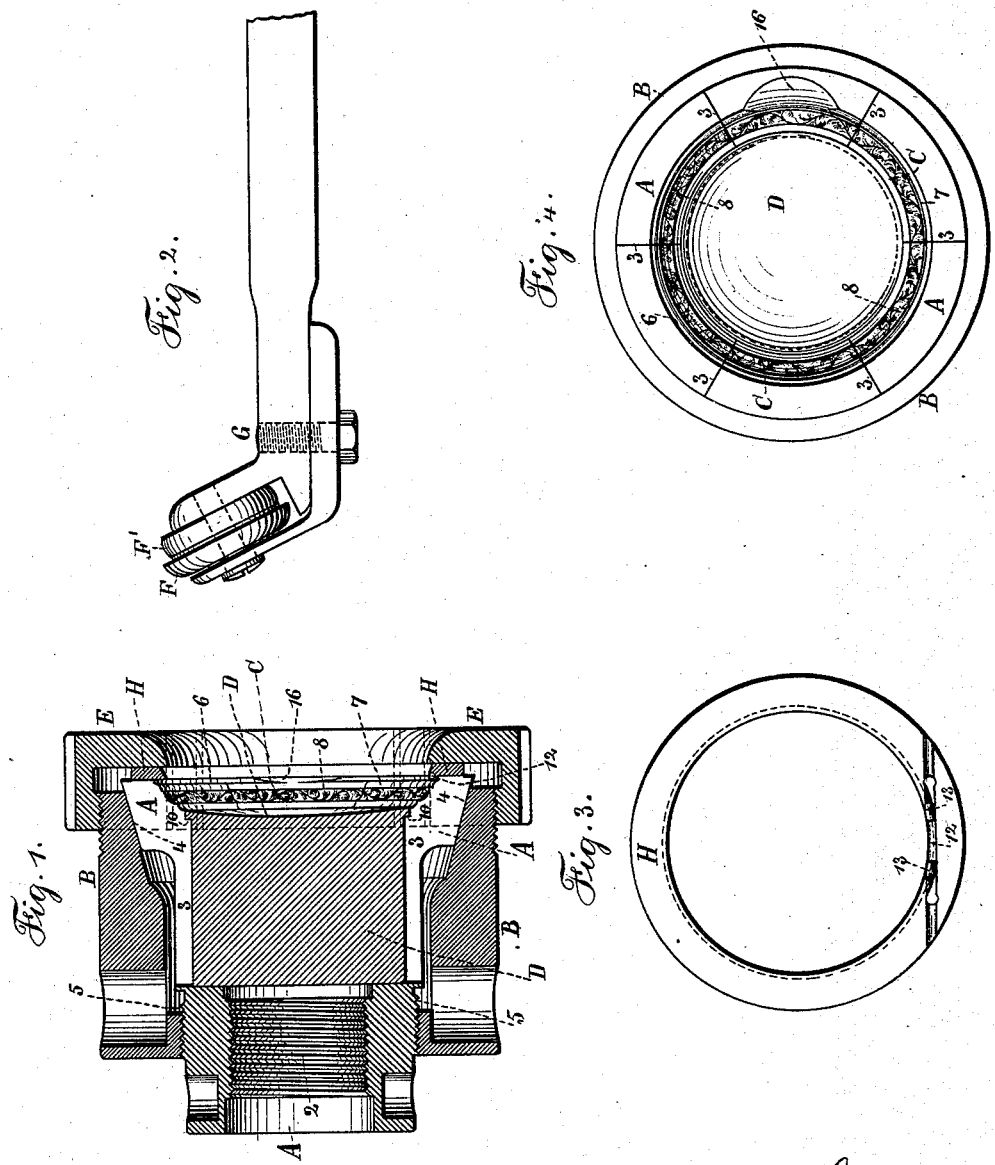
Witnesses:
J. Stail
Chas. H. Smith
Inventor:
Walter H. Fitz Gerald
per Lemuel W. Serrell Atty
N. PETERS, Photo-Lithographer, Washington, D. C.

UNITED STATES PATENT OFFICE.

WALTER H. FITZ GERALD, OF BROOKLYN, NEW YORK, ASSIGNOR TO FREDERIC ECAUBERT, OF SAME PLACE.

DIE FOR WATCH-CASES.

SPECIFICATION forming part of Letters Patent No. 416,835, dated December 10, 1889.

Application filed July 18, 1889. Serial No. 317,884. (No model.)

*To all whom it may concern:*

Be it known that I, WALTER H. FITZ GERALD, of Brooklyn, in the county of Kings and State of New York, have invented an Improvement in Dies for Watch-Cases and Similar Articles, of which the following is a specification.

This invention relates to the peculiar construction of die that is adapted to shape or ornament the surfaces of the lids or bezels of watch-cases, lockets, or similar articles, whereby the manipulation of the die is rendered much easier and more rapid, and the die is adapted to the manufacture of lids, bezels, or similar articles, with either plain or ornamental surfaces.

In the drawings, Figure 1 is a longitudinal section of the dies in position for use. Fig. 2 represents a roller that may be made use of in forming up the article within the dies. Fig. 3 is a rear view of the ring employed with rings, lids, or bezels having a hinge; and Fig. 4 is a face view of the chuck and die with the clamping-ring removed.

The split chuck A is made as a hollow cylinder, adapted to be screwed at 2 upon the mandrel of a suitable lathe. This chuck is divided by longitudinal and radial incisions 3, that separate the operative portion of the chuck into two or more sections. I have represented six of said incisions, and they extend from the face of the chuck back to the screw portion 2, or nearly so, and the exterior 4 of such chuck is tapering, and there is a screw-thread at 5, upon which is screwed the compressing-shell B, which has a tapering interior surface to fit the taper 4, and when this cylinder is screwed forward against the taper 4 the sections of the split chuck A are brought closely together at the end or operative portion of such split chuck, it being understood that the incisions or saw-cuts 3 are made as narrow as possible, and the spring of the metal opens the sections when the compressing-cylinder B is screwed back. The object of this feature of my improvement is to allow for the die portion C of the split chuck A being opened for the liberation of the watch-case lid or other article that may have been formed within or against such die portion C of the split chuck. It is now to be understood that the die portion C of the split chuck is to have an interior surface corresponding to the exterior of the watch-case, bezel, lid, or similar article that is to be made within the die. I have represented offsets or shoulders at 6 and 7 in the die portion C and a vermicelli ornament at 8; and it is to be understood that the offsets are to be turned up accurately, and that the ornament in the die is the reverse of that to be produced upon the surface of the metal, the raised portions of the die producing the depressed portions of the ornament, so that in every respect the surface of the die portion corresponds to the surface of the article to be produced, and in the manufacture of watch and locket cases or lids a die D, having either a flat or concave surface, is introduced within the cylindrical portion of the split chuck A, and the same rests against a shoulder 10, that supports such die in its proper position; but the diameter of this concave die is to correspond to the internal diameter of the split chuck A, after the same has been tightly closed by the compressing-shell B.

The blank article to be operated upon is inserted within the die portion C, such article having been prepared by ordinary stamping-dies or otherwise, of the size and shape approximating the article to be finished and the screw-holding ring E is screwed upon the exterior of the compressing-shell B, to hold the blank within the die while such blank is being revolved by the chuck and acted upon by a roller or suitable rollers in succession. I have represented one of said rollers at F F' upon a stock or holder G. The shape of this roller will conform to the interior shape of the finished article, so that as such roller is pressed outwardly from within the article that is being operated upon the metal will be extended and pressed into the interior of the die portion C until the same fills the die portion fully and the exterior of the article corresponds to the interior of the die. After this has been done the holding-ring E is removed, the compression-shell B slackened, and the split chuck expands sufficiently to loosen the article produced, and such article is removed and a new blank inserted.

In the manufacture of bezels and rings having ornaments in the portion corresponding to the vermicelli ornaments 8 it is necessary that the metal be pressed against such ornament, and this ornament being concave and smaller in diameter at one portion than another it is preferable to make use of the roll F F' upon an axis that is inclined to the stock G, in order that a pressure may be exerted by the roll to press the metal firmly into the ornament 8.

In the manufacture of lids for watch-cases and similar articles it has been usual to file or cut semicircular channels at the places where the hinge is to be introduced, and to make such hinge of tubular sections set into such semicircular channels and soldered in place.

In order to adapt this invention to the ornamentation of lids or bezels that have hinge-sections on them, I employ a ring H to rest against the surface of a split chuck A and be clamped thereto by the holding-ring E, and in this ring H is a counterpart of a hinge—that is to say, at 12 is a recess that is nearly cylindrical—into which the metal tube that forms one section of the hinge upon the watch-case lid or bezel is introduced, and at 13 are projections that are semicircular, or nearly so, to maintain in the watch lid or bezel the recesses for the portions of the hinge that are upon the center of the watch-case; hence the dies with this ring H are adapted to ornamenting and finishing watch-case lids or bezels that have hinge-sections on them; but when this ring H is not employed the dies can be used for lids, bezels, or rings that are not provided with hinge-sections.

The patent, No. 253,355, granted to F. Ecaubert, February 7, 1882, illustrates the successive rollers that may be made use of in operating within the circular or ring shape blank to extend the same into the internal die, so as to make the surface of the article operated upon exactly the same as the internal surface of the die.

In some watch-case lids, bezels, or rings there is a projection or thumb-piece at one side. I form a recess in the die at 16, adapted to receive this thumb-piece that may be upon the blank when inserted into the die, or this recess may be of the shape required for the thumb-piece, the metal being extended into the same by the action of the roll F F'.

In my present improvement I make use of two separate rolls F and F', lying closely one against the other, and of the required relative diameters and shapes, so that they may roll upon the surfaces with which they are in contact without any slipping or rubbing action, either upon the metal that is being extended and shaped or upon the interior portion of the die or the holding-ring. In the roll shown, the roll or disk F' is intended to come into contact with the interior surface of the holding-ring E, to limit the action of the roll F upon the metallic blank that is being spun up.

I sometimes make use of a central holding button or follower that is pressed against the central part of the interior of the lid to hold the metal firmly against the surface of the die D, while the roller F is being pressed against the metal to force the same into the engraved work at 8. This follower prevents the metal being buckled or distorted in shape by the action of the roller F.

It is to be understood that the engraved work upon the inside of the die is the counterpart of that upon the watch-case, and although the engraving of such die has to be very accurate and is expensive and difficult to do by hand within the hollow die, still the watch-cases can be produced so rapidly in this die that its first expense is immaterial.

I claim as my invention—

1. The combination, with the split chuck A, having a tapering exterior surface, of the compressing-shell B, screwed upon the same and acting to close the split chuck, such split chuck having an internal die portion C, containing offsets or ornaments, or both, corresponding to the surface of the watch-case bezel, back, or ring to be produced within such die portion, substantially as set forth.

2. The combination, with the compressing-shell B, of the split chuck A, having a die portion C corresponding in shape to the exterior of the article to be produced, and the die D within the central opening in the split chuck A, and the screw-holding ring E, upon the exterior of the compressing-shell B, substantially as set forth.

3. The combination, with the chuck having an internal die portion D, of the ring H, having a recess and projections adapted to the hinge of the watch-case, bezel, or lid, or similar article, substantially as set forth.

4. The combination, with the internal die corresponding to the exterior surface of the article to be produced, of two rolls on the same axis and of different diameters or shapes, one or both of which act within the article to be produced in expanding the metal blank, substantially as set forth.

5. The combination, with the chuck having an internal die portion D, of the ring H, having a recess adapted to the hinge, and the holding-ring E, substantially as set forth.

6. The combination, with the compressing-shell B, of a split chuck A, having an interior die portion C, and a recess 16, for the thumb-piece, substantially as set forth.

Signed by me this 16th day of July, 1889.

WALTER H. FITZ GERALD.

Witnesses:
 GEO. T. PINCKNEY,
 WILLIAM G. MOTT.